(12) United States Patent
Bauchspies et al.

(10) Patent No.: US 10,621,765 B2
(45) Date of Patent: Apr. 14, 2020

(54) IMAGE RECONSTRUCTION

(71) Applicant: IDEX ASA, Fornebu (NO)

(72) Inventors: Roger A. Bauchspies, Gustine, CA (US); Sigmund Clausen, Haugesund (NO); Arne Herman Falch, Haslum (NO)

(73) Assignee: IDEX ASA, Fornebu (NO)

( * ) Notice: Subject to any disclaimer, the term of this patent is extended or adjusted under 35 U.S.C. 154(b) by 422 days.

(21) Appl. No.: 15/201,901

(22) Filed: Jul. 5, 2016

(65) Prior Publication Data

US 2017/0011540 A1 Jan. 12, 2017

Related U.S. Application Data

(60) Provisional application No. 62/189,488, filed on Jul. 7, 2015.

(51) Int. Cl.
*G06T 11/60* (2006.01)
*G06K 9/00* (2006.01)
*G06T 5/00* (2006.01)

(52) U.S. Cl.
CPC .......... *G06T 11/60* (2013.01); *G06K 9/00013* (2013.01); *G06K 9/00026* (2013.01); *G06T 5/001* (2013.01)

(58) Field of Classification Search
CPC ..... G06T 11/60; G06T 5/001; G06K 9/00087; G06K 9/00013; G06K 9/00026
See application file for complete search history.

(56) References Cited

U.S. PATENT DOCUMENTS

| 4,573,201 A | 2/1986 | Hashiyama et al. |
| 5,067,162 A | 11/1991 | Driscoll, Jr. et al. |
| 5,799,098 A | 8/1998 | Ort et al. |

(Continued)

FOREIGN PATENT DOCUMENTS

| EP | 1183638 A1 | 3/2002 |
| EP | 3115932 A1 | 1/2017 |

(Continued)

OTHER PUBLICATIONS (Lockie, Mark, ed. The Biometric Industry Report—Forecasts and Analysis to 2006. Elsevier, 2012.*

(Continued)

*Primary Examiner* — Menatoallah Youssef
(74) *Attorney, Agent, or Firm* — Kilpatrick Townsend & Stockton LLP

(57) ABSTRACT

A system, method, and computer program product for efficiently reconstructing a pattern, such as a fingerprint, from a set of multiple impressions of portions of that pattern. The system may evaluate images of patterns taken from a series of multiple impressions and reconstruct the pattern from the image portions while providing the operator with realtime feedback of a status of the set of images. As each new image portion is evaluated, a display graphic or other indicator provides feedback when a new image portion is added to the reconstruction image, or when a new image portion is not added (such as it representing a duplicate). Other status indications may be provided, and when the indication is visual, a degraded resolution of the pattern map may be provided on the display graphic to improve security.

16 Claims, 6 Drawing Sheets

(56) References Cited

U.S. PATENT DOCUMENTS

| | | | |
|---|---|---|---|
| 5,828,773 A | 10/1998 | Setlak et al. | |
| 5,845,005 A | 12/1998 | Setlak et al. | |
| 5,852,670 A | 12/1998 | Setlak et al. | |
| 5,909,501 A | 6/1999 | Thebaud | |
| 5,926,555 A | 7/1999 | Ort et al. | |
| 6,241,288 B1 | 6/2001 | Bergenek et al. | |
| 6,285,789 B1 | 9/2001 | Kim | |
| 6,330,588 B1* | 12/2001 | Freeman | G06F 9/4862 709/202 |
| 6,546,122 B1 | 4/2003 | Russo | |
| 6,795,569 B1 | 9/2004 | Setlak | |
| 6,836,554 B1 | 12/2004 | Bolle et al. | |
| 6,895,104 B2 | 5/2005 | Wendt et al. | |
| 7,027,626 B2 | 4/2006 | Funada | |
| 7,142,699 B2 | 11/2006 | Reisman et al. | |
| 7,203,347 B2* | 4/2007 | Hamid | G06K 9/0002 340/5.53 |
| 7,236,617 B1* | 6/2007 | Yau | G06K 9/00026 382/125 |
| 7,330,571 B2 | 2/2008 | Svensson et al. | |
| 7,330,572 B2 | 2/2008 | Uchida | |
| 7,512,256 B1 | 3/2009 | Bauchspies | |
| 7,574,022 B2 | 8/2009 | Russo | |
| 7,599,530 B2 | 10/2009 | Boshra | |
| 7,616,787 B2 | 11/2009 | Boshra | |
| 7,634,117 B2 | 12/2009 | Cho | |
| 7,643,660 B1 | 1/2010 | Bauchspies | |
| 7,787,667 B2 | 8/2010 | Boshra | |
| 7,912,256 B2 | 3/2011 | Russo | |
| 7,970,186 B2 | 6/2011 | Bauchspies | |
| 8,295,561 B2 | 10/2012 | Kwan | |
| 8,638,994 B2 | 1/2014 | Kraemer et al. | |
| 9,135,494 B2 | 9/2015 | Boshra et al. | |
| 9,202,099 B2 | 12/2015 | Han et al. | |
| 2005/0238211 A1* | 10/2005 | Du | G06K 9/00026 382/124 |
| 2007/0263912 A1 | 11/2007 | Biarnes et al. | |
| 2009/0083847 A1 | 3/2009 | Fadell et al. | |
| 2014/0003677 A1* | 1/2014 | Han | G06K 9/00006 382/124 |
| 2014/0003681 A1 | 1/2014 | Wright et al. | |
| 2015/0135108 A1 | 5/2015 | Pope et al. | |
| 2015/0294131 A1 | 10/2015 | Neskovic et al. | |
| 2016/0063300 A1* | 3/2016 | Du | G06K 9/00033 382/124 |
| 2017/0004350 A1 | 1/2017 | Clausen | |

FOREIGN PATENT DOCUMENTS

| | | |
|---|---|---|
| WO | 2005008568 A1 | 1/2005 |
| WO | 2005034021 A1 | 4/2005 |

OTHER PUBLICATIONS

Bhati, Satish H., and Umesh C. Pati. "Novel algorithm for fingerprint mosaicing using phase correlation method." 2015 Global Conference on Communication Technologies (GCCT). IEEE, 2015. (Year: 2015).*

(Lockie, Mark, ed. The Biometric Industry Report—Forecasts and Analysis to 2006. Elsevier, 2012. (Year: 2012).*

Extended European Search Report for EPO Application No. 16178067.1-1901 dated Dec. 5, 2016.

Cattin P C et al: "Retina mosaicing using local features" Security in Communications Networks : Third International Conference : Revised Papers/SCN 2002, Amalfi, Italy, Sep. 11-13, 2002; [Lecture Notes in Computer Science, ISSN 0302-9743, Springer Verlag, DE, vol. 4191 LNCS-II, Jan. 1, 2006 (Jan. 1, 2006), pp. 185-192, XP002518306, DOI: 10.1007/11866763_23 ISBN: 978-3-540-24128-7.

-I.B. Mitchell: "Image Fusion: Theories, Techniques and Applications" in: "Image Fusion: Theories, Techniques and Applications", I Jan. 2010 (2010-01-01), Springer, Berlin, XP055323263, Isbn: 978-3-642-11215-7 p. 42.

Anil Jain et al., "Fingerprint Mosaicking" Proceedings of IEEE International Conference on Acoustics, Speech, and Signal Processing (ICASSP), Orlando, Florida, May 13-17, 2002.

Arun Ross et al., "Image Versus Feature Mosaicing: A Case Study in Fingerprints" Proc. of SPIE Conference on Biometric Technology for Human Identification III, (Orlando, USA), pp. 620208-1-620208-12, Apr. 2006.

Koichi Ito, et al., "A Fingerprint Matching Algorithm Using Phase-Only Correlation", IEICE Trans. Fundamentals, vol. E87-A, No. 3, Mar. 2004.

Koichi Ito, et al., "A Fingerprint Recognition Algorithm Combining Phase-Based Image Matching and Feature-Based Matching" D. Zhang and A.K. Jain (Eds.) ICB 2005, LNCS 3832, pp. 316-325, 2005 (C) Springer-Verlag Berlin, Heidelberg 2005.

Koichi Ito, et al., "A Fingerprint Recognition Algorithm Using Phase-Based Image Matching for Low-Quality Fingerprints" 0/7803-9134-9/05/$20.00 (C) 2005 IEEE.

Sandhya Tarar et al., "Fingerpring Mosaicking Algorithm to Improve the Performance of Fingerprint Matching System" Computer Science and Information Technology 2(3): 142-151, 2014.

Y.S. Moon et al., "Template Synthesis and Image Mosaicking for Fingerprint Registration: An Experimental Study" 0/7803-8484-9/04/$20.00 (C) 2004 IEEE.

Bhati "Fingerprint Mosaicing using Modified Phase Correlation Method Signal and Image Processing," Department of Electronics and Communication Engineering National Institute of Technology, Rourkela; Rourkela, Odisha India; Jun. 2015 (date provided on document; Applicant makes no representation or admission as to publication or prior art date).

Bhati et al. "Novel Algorithm for Fingerprint Mosaicing using Phase Correlation Method," 2015 Global Conference on Communication Technologies (GCCT), IEEE, Apr. 23, 2015, 5pgs (date provided by EPO examiner; Applicant makes no representation or admission as to publication or prior art date).

European Application No. EP16178067.1 Examination Report, dated Jun. 26, 2019, 6 pgs.

* cited by examiner

IMAGE RECONSTRUCTION

CROSS REFERENCE TO RELATED APPLICATIONS

This application claims benefit from U.S. Patent Application No. 62/189,488 filed 7 Jul. 2015, the contents of which are hereby expressly incorporated by reference thereto in its entirety for all purposes.

FIELD OF THE INVENTION

The present invention relates generally to automated machine-implemented pattern mapping, and more specifically, but not exclusively, to systems, methods, and computer program products for reconstructing a pattern from a set of image portions of that pattern, such as, for example, an image used in pattern verification systems, methods, and computer program products, including fingerprint verification systems.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Pattern verification, such as in a context of registration of a trusted fingerprint into a trusted memory of a fingerprint verification system, requires a sufficiently accurate and precise image of the trusted fingerprint (how accurate and how precise are dependent upon design considerations of a particular embodiment). This image may be obtained directly from an imaging sensor. This may be suitable for large area imaging sensors. However, for many applications, the trusted image is reconstituted from image portions of the trusted fingerprint taken from a sensor having a sensing area smaller than the final image. For many mobile applications and electronic platforms, such as smartphones and the like, the use of the small sensor provides a smaller form factor having a lower cost of goods which is important to implementation and adoption. However use of the smaller sensor impacts registration and user experiences during verification.

Any mobile electronic platform having a fingerprint verification system typically includes a registration system that establishes and writes one or more trusted images into a trusted database/memory. Test fingerprints are compared against the trusted image(s) using a matching engine that matches features of interest from the test fingerprint against features of interest from the trusted image(s). A quality of the test image and of the trusted images impact the user experience.

Whatever the size of the imaging sensor, the trusted image may be derived from a single impression from a single finger, or derived from a composition of multiple impressions. Each solution offers different challenges.

It is technically possible to rely on a single impression of a single finger using a small area sensor for registration. However, during use, the user must not only recall which portion of which finger was registered, but each verification attempt relies on the user reimaging this same portion of the same finger sufficiently close that it may be matched. As the imaging sensor becomes smaller, reliance on a single impression can become very frustrating for the user.

Many systems using a small area sensor therefore register a single finger using multiple impressions. An initial impression of an image portion always provides completely unique information of the larger image to be reconstituted. However, subsequent impressions have varying usefulness depending upon whether the user provides an impression that partially overlaps and partially presents new image data. The user has difficulties in placing a finger for multiple impressions to ensure only unique partial overlapping data is presented with each impression, particularly over a breadth of an entire fingerprint pattern. It is too easy for a user to provide subsequent images with too much overlap or with too little or no overlap. A user does not know when or if they have provided enough sufficiently overlapping image impressions that map enough of the total fingerprint to provide an end product that provides the user with an easy-to-use verification system.

From a perspective of a user, this can become very challenging as the sensor imaging area decreases. Registration systems do not provide feedback to the user of a status of the finger area mapping process. An accuracy of the registration process is degraded when the set of image portions are unable to produce the needed larger image.

Existing systems employ stitching systems that create a bigger image from ridge map information of the individual image portions. Such a system adds increased complexity to a registration system that, as further explained herein, already includes resources sufficient to map or reconstitute a single image from multiple images provided using multiple impressions of an image source.

A simple system may assume, without checking, that each impression from a multi-impression set of images are all unique qualifying images from a single finger. Systems that rely on a preset number of unqualified image impressions produce a varying quality for the final image to be used in the trusted database. Subsequent verification based upon these registrations results in a wide range of user experience in a quality of the verification process. Some users that are unfamiliar with registration may use different fingers in a registration system designed for a single finger registration process. Such image portions can also degrade the registration process in many different ways.

Systems for processing image portions of a pattern may sometimes be desirably implemented using limited computing and memory resources. As an active area of a sensor decreases, a greater number of image portions are needed to cover any particular area of the pattern. Managing and processing multiple portions can sometimes negatively impact performance, particularly if other systems and methods may be implemented to address this impact.

What is needed is a system and method for efficiently reconstructing a pattern, such as a fingerprint, from a set of multiple impressions of portions of that pattern.

BRIEF SUMMARY OF THE INVENTION

Disclosed is a system, method, and computer program product for efficiently reconstructing a pattern from a set of multiple impressions of portions of that pattern. The following summary of the invention is provided to facilitate an understanding of some of the technical features related to evaluating and constructing a pattern from a pattern source such as a finger that is used to create many portions of the pattern, and is not intended to be a full description of the present invention. A full appreciation of the various aspects of the invention can be gained by taking the entire specification, claims, drawings, and abstract as a whole. The present invention is applicable to other patterns in addition to fingerprints, other pattern sources in addition to fingers, to other systems in addition to registration or verification systems, to systems that do not include a matching engine, and to a range of sensor sizes.

In an embodiment of the present invention, a pattern source (e.g., a finger) may include a pattern (e.g., a fingerprint). For a system that does not process the pattern (fingerprint) directly, the system may process a representation (e.g., a pattern map) of the pattern (fingerprint). When a user uses an impressioner (e.g., places a pattern source (finger) on a sensor or imager or other impression producing structure), the system may produce an impression (e.g., an image) of a portion of the pattern (fingerprint) of the pattern source (finger) of the user. Impressions (images) may be collected and evaluated, in bulk or in realtime or in near realtime depending upon a particular implementation. Reconstruction of the pattern or of the pattern map happens in a reconstruction space of the system (e.g., a portion of memory) where an initial impression (a foundation image) is selected and placed in an otherwise null reconstruction space. The system may qualify each impression (image) and may divide the impressions into a reconstruction set and a reserve set based upon matching or correlating to the reconstruction. As the qualification proceeds (matching and correlating to the reconstruction) a qualified set of impressions (images) are identified (the reconstruction set) and are added into the reconstruction space as they are matched/correlated or into the reserve space (e.g., a different portion of the memory as not matched/not correlated). A reconstruction (e.g., a reconstruction image or other representation of the pattern or pattern map) is produced from the impressions (images) from the reconstruction set and reconstructed in the reconstruction space. The reconstruction may occur as each impression is added into the reconstruction space or the reconstruction may occur after identification of multiple elements of the reconstruction set.

In an embodiment, a process may be repeated until a number of impressions (images) is "enough," such as, for example, when a number of impressions in the reconstruction set meets a predetermined count, when a quality metric for the reconstruction meets or exceeds a predetermined value, or some other termination event occurs.

In an embodiment, a user may be provided with feedback (e.g., visual cues on a display or aural signals from a transducer) as to various status changes of the reconstruction, reconstruction set, reserve set, or other processing or evaluation of any particular impression.

In an embodiment, a system may produce a reconstruction image of a fingerprint from a set of bitmap images derived from that fingerprint.

In an embodiment, a reconstruction image may be updated in realtime (or near realtime) as each bitmap image is made available. The reconstruction image may be used to improve a quality of the reconstruction set of bitmap images used in its reconstruction.

In an embodiment, a quality may be improved by providing feedback to the user as each bitmap image is obtained. That feedback may provide, for example, information about what portion of the fingerprint was imaged, how much of the fingerprint has been matched by the reconstruction, whether a particular bitmap image is a duplicate of another bitmap image that has been previously received, among other, or additional, information.

In an embodiment, feedback may be provided visually through a display graphic presented on, or in association with, a fingerprint sensor collecting the set of images. In other embodiments, feedback may be provided by an audio cue in addition to, or in lieu of, a visual indication.

In an embodiment, a system may include one or more aspects selected from: a) reconstructing a reconstruction image from a set of qualified bitmap images, b) evaluating a quality of the set of qualified bitmap images and/or a quality of the reconstruction image reconstructed from these images, and c) providing feedback to the user regarding some status of the reconstruction or qualification process, which may in some cases improve on the quality or efficiency of one or more parts of the process.

In an embodiment, a system may include reconstruction of a trustworthy reconstruction image from a collection of bitmap images, such as for registration, validation, verification, or the like.

In an embodiment, a system may improve on the collection of data from a user by providing feedback to the user of one or more states of the reconstruction process. For example when a matching/correlating image is added into the reconstruction space, the feedback may indicate to the user that new data has been added/accepted. When a non-matching/non-correlating image is not put into the reconstruction space, the feedback may indicate to the user that no new data has been added/accepted. Responsive to the feedback, the user may gauge where to contact which part of a finger with the sensor to build out a quality reconstruction image.

In an embodiment, a single reconstruction image is produced that may be suitable for verification, validation, testing, and other trusted uses as a trusted image. This single reconstruction image is produced from the images in the reconstruction set. In some cases it may be advantageous to remove the images from the reconstruction set and use the reconstruction image while in some embodiments it may be advantageous to also preserve the individual images used in the reconstruction.

In an embodiment, a system may include reconstructing a single reconstruction image from a qualified set of bitmap images that all match or correlate to a foundation image. The system may retain and hold non-matching/non-correlating bitmap images in a reserve set as any subsequent image may provide a correlation bridge between an image under evaluation and the foundation or reconstruction image. In the case of a correlation bridge, several bitmap images will be added into the reconstruction set at once and thus be used to reconstruct the reconstruction image. This reconstruction set excludes non-matching/non-correlating bitmap images (they may not match for several reasons—image quality, from a different pattern source (e.g., a different finger), a different part of the same pattern source, or some other factor.

In an embodiment, a system may include providing feedback (in a number of ways) to a user. In one case, a realtime (or near realtime) application that responds to each image of the finger on a fingerprint sensor (as opposed to some offline application that processes an entire set of bitmap images that had been recorded previously), may inform the user whether the image has been added to the reconstruction set, and/or not been added into the reconstruction set. In one example, this feedback may take the form of a display graphic of a representation of the reconstruction image arising from the current set of images in the reconstruction set. As the reconstruction image grows larger with each new image added into the reconstruction set, the display graphic may be updated to show various details of the new image in regards to the previously existing reconstruction image. In some cases, the display graphic is a representation of the reconstruction image as it is being reconstructed, with the representation updated as to location, rotation, and scale, and other positioning of a newly added bitmap image. Such feedback may allow the user to visualize where "gaps" exist in the reconstruction image to help guide them in placing a particular portion of their finger onto the sensor. In some cases, it may be desired that the representation of the reconstruction image have a degraded fidelity so as to not compromise security by providing external access to the image(s) in the trusted registration database. A degraded representation may have enough fidelity to guide the user but not so much as to be useful in validating against the actual trusted image(s). In some cases, the degraded fidelity may be a simple filled-in block or empty perimeter shape substituted for the bitmap image(s) added to the reconstruction image.

In an embodiment, a system may include use of a quality metric for processing and/or for providing feedback—it is possible that a system could reconstruct a reconstruction image from a predetermined number of bitmap images to complete registration without regard to how "good" the information was that was received or how good the reconstruction was (if a reconstruction is even produced). A system like that could produce varying and unpredictable levels of security to different users. In contrast, developing a quality metric on the reconstruction image (which indirectly indicates a quality of the images of the reconstruction set), one can improve the performance of the registration system by ensuring that what is stored in the registration system is likely to be robust for most users producing a predictable and consistent level of performance. In one example, the quality metric may be a percentage area coverage. The target may be to have a certain area of coverage (x square centimeters)—and the reconstruction image can be calculated to have a current coverage (y square centimeters)—when the ratio has a predetermined status, e.g., it meets or exceeds the target, the system may determine that the quality of the reconstruction image is sufficient. Such determination may impact other parts of the system, for example, it may indicate that the user can stop providing images of their finger.

In an embodiment, a system may collect a set of bitmap images from multiple images of a finger. As each image is collected, it is tested against stored images. When an image matches (by use of a matching or other alignment engine) any stored image or the reconstruction image, the process differentiates what is being matched. If the match is to a stored image and reconstruction has not yet started, the process evaluates whether the foundation (e.g., initial) image should be replaced. When it is to be replaced, the foundation image is substituted with another bitmap image and it becomes the new foundation image. When no replacement is necessary, and after the reordering, the process determines whether the image is correlated to the new foundation image. When it matches but is uncorrelated to the foundation image, the process tests whether it is a duplicate image. Non-duplicate images are stored and a display graphic may be updated while duplicate images are not scored and may be used to update the display graphic.

When the image is correlated, it is rotated and translated into position and overlaid on the underlying image(s). Phase correlation or other fine placement process tests the initial match presumption. When this presumption is tested and fails by the phase correlation or fine placement process, the process branches to the duplication test. Otherwise, the process blends the new image with the current image of the pattern reconstruction to create a new reconstruction image in a reconstruction space (e.g., a portion of writeable memory or other data storage element). After blending, all image portions that were blended may be removed from storage. A test is taken to determine whether there are any additional stored images. When the number of stored images is greater than zero, the process returns to the match process and tests the stored images against the new reconstruction image. When there are no more stored and untested images, a quality metric of the reconstruction image is determined. One metric of whether enough images have been processed is to calculate a reconstructed image quality metric. This quality metric sets 100% as a value for an entire pattern (e.g., the fingerprint). As image portions are blended together into the reconstruction image, a coverage area is calculated. Dividing this coverage area by an area associated with 100% coverage provides a percentage coverage. When this percentage coverage has a pre-established relationship (e.g., exceeds) a preset threshold, then the quality metric is determined to meet a target (e.g., >50%, >75%, >80%, >85%, >90%, >95%, >99% or some other value) to stop the collection and processing. When the quality metric is lower than desired, the process continues to test duplicates and collect new images when available (and may indicate to the user a goal to provide more images) and may flag the reconstruction as failing the quality metric for additional processing consistent with this status.

Information derived from the reconstruction image in the reconstruction space may be used for feedback. The reconstruction image helps to ensure that registration information based upon the set of qualified images may be used for further processing as a high-quality trusted image that is able to contribute to improved performance in subsequent use, such as in a pattern verification system.

In an embodiment, a system may include a user feedback interface in which a coverage graphic derived from the reconstruction image is presented to the user. As each image is collected and qualified, the coverage graphic may respond by indicating to the user a placement of the newly added images into the reconstruction image so the user is able to easily identify what part(s) of the fingerprint have been passably imaged and which parts remain. When a newly captured image from an impression is not added into the reconstruction set (e.g., no match or no correlation with the reconstruction image) some indication may be provided to the user. This helps the user know which images are adding to the reconstruction image and which are not. Also, it helps the user to understand how quickly the reconstruction image is completing towards the quality metric. The indication may have a visual and/or aural component. In some cases, a representation of the target may be included to allow the user to gauge how close they are to completion.

In an embodiment, a system may present the reconstruction image in the coverage graphic. However, for security reasons, some embodiments may include an option to degrade a resolution or other visualization of the coverage graphic so that the user understands how each new impression has contributed to the reconstruction image without providing a high-resolution image of the reconstruction image (e.g., an accurate copy of the fingerprint). For example, a solid rectilinear element may be added into the coverage graphic corresponding to each blended image portion added to the reconstruction image.

In an embodiment, a system may provide an ability to use a different alignment engine in support of the matcher, or in lieu of the matcher and/or phase correlator, in establishing match, correlation, and/or alignment. An environment and application help to determine an appropriate alignment system to be used. Factors influencing the choice depend not only on the available storage and processing resources available to the system, but also to the resolution and imaging area of the sensor as well as pattern source size. There are many parameters that may be implemented—for example a fingerprint image may be about 15×24 mm and be imaged from multiple impressions taken with a sensor having a 4×4 mm imaging area and 15 pixels/mm. Different values are possible for these parameters, the values impacting the amount of data to be processed by the alignment engine. As the total amount of data decreases, more direct comparison and trial-and-error testing may be used. For example, phase correlation techniques for comparing various orientations and relative translations of a first image against a second image may be sufficient such that the matcher is not needed. As the total amount of data increases, higher-level processing may be useful, such as use of a matching engine that establishes and compares features of interests between the test images. An alignment engine may employ a hybrid solution having multiple phases, such as first schema for general placement and a second schema for precise placement.

In an embodiment, a system may feature either one or two aspects in improving a fingerprint registration process. One aspect provides feedback, which may be in realtime contemporaneous with sampling a fingerprint, to a user to improve the user experience in developing a reconstruction image. As the fingerprint is sampled, location information of the sample in the context of the fingerprint is provided to the user. This makes development of a quality reconstruction image more efficient. Another aspect relates to creation and improvement in the quality of the reconstruction image itself. Registration systems and methods may use the set of images used in the reconstruction image in subsequent processing. For example, in a fingerprint registration system for developing trusted patterns for storage in a trusted environment, an encrypted template that is stored in a trusted memory is used rather than the images themselves. The better the quality of the reconstruction image, the better the quality of any derived template or use. Such an encrypted template and other uses of the reconstruction image are improved by having a sufficiently large portion of the source fingerprint accurately mapped and blended. In some ways these aspects may be independent though related and an embodiment may implement a solution having one or both aspects.

A machine-implemented method for reconstructing a portion of a representation of a pattern from a set of impressions, each impression including a portion of the pattern, the method including a) selecting one of the impressions as a foundation impression having a foundation pattern portion of a foundation pattern source; b) processing the set of impressions to determine a reconstruction set of impressions, the portion of the pattern of each impression of the reconstruction set matched or correlated to the foundation pattern portion, wherein the reconstruction set of impressions excludes each impression from the set of impressions with its portion of the pattern not matched or not correlated to the foundation pattern portion; and c) combining the impressions of the reconstruction set into a single reconstruction impression, the single reconstruction impression including the portion of the representation spanning a reconstruction metric greater than an impression metric of any single impression of the reconstruction set.

A machine-implemented method for reconstructing a portion of a fingerprint from a set of bitmap images, each bitmap image including a portion of a fingerprint from a finger, the method including a) selecting one of the bitmap images as a foundation image having a foundation pattern portion of a foundation pattern source, b) processing the set of bitmap images to determine a reconstruction set of bitmap images, the portion of the pattern of each bitmap image of the reconstruction set matched or correlated to the foundation pattern portion, wherein the reconstruction set of bitmap images excludes each bitmap image from the set of bitmap images with its portion of the pattern not matched or not correlated to the foundation pattern portion, and c) combining the bitmap images of the reconstruction set into a single reconstruction image, the single reconstruction image including the portion of the fingerprint spanning a reconstruction area greater than an image area of any single bitmap image of the reconstruction set.

An apparatus for reconstructing a portion of a representation of a pattern from a set of impressions, each impression including a portion of the pattern, including a pattern collector producing one or more of the impressions; and a processing system, coupled to the pattern collector, including a processor and a memory coupled to the processor, the memory storing a plurality of computer executable instructions wherein the processor executes the plurality of computer executable instructions to perform a method, including a) selecting one of the impressions as a foundation impression having a foundation pattern portion of a foundation pattern source; b) processing the set of impressions to determine a reconstruction set of impressions, the portion of the pattern of each impression of the reconstruction set matched or correlated to the foundation pattern portion, wherein the reconstruction set of impressions excludes each impression from the set of impressions with its portion of the pattern not matched or not correlated to the foundation pattern portion; and c) combining the impressions of the reconstruction set into a single reconstruction impression, the single reconstruction impression including the portion of the representation spanning a reconstruction metric greater than an impression metric of any single impression of the reconstruction set.

An apparatus for reconstructing a portion of a representation of a fingerprint from a set of bitmap images, each bitmap image including a portion of a fingerprint from a finger, including a pattern collector producing one or more of the bitmap images, and a processing system, coupled to the pattern collector, including a processor and a memory coupled to the processor, the memory storing a plurality of computer executable instructions wherein the processor executes the plurality of computer executable instructions to perform a method, including a) selecting one of the bitmap images as a foundation image having a foundation fingerprint portion, b) processing the set of bitmap images to determine a reconstruction set of bitmap images, the portion of the fingerprint of each bitmap image of the reconstruction set matched or correlated to the foundation fingerprint portion, wherein the reconstruction set of bitmap images excludes each bitmap image from the set of bitmap images with its portion of the fingerprint not matched or not correlated to the foundation fingerprint portion, and c) combining the bitmap images of the reconstruction set into a single reconstruction image, the single reconstruction image including the portion of the representation of the fingerprint map spanning a reconstruction area greater than an image area of any single bitmap image of the reconstruction set.

A non-transitory computer readable medium with computer executable instructions stored thereon executed by a processor to perform the method of reconstructing a portion of a representation of a pattern from a set of impressions, each impression including a portion of the pattern, the method including a) selecting one of the impressions as a foundation impression having a foundation pattern portion of a foundation pattern source; b) processing the set of impressions to determine a reconstruction set of impressions, the portion of the pattern of each impression of the reconstruction set matched or correlated to the foundation pattern portion, wherein the reconstruction set of impressions excludes each impression from the set of impressions with its portion of the pattern not matched or not correlated to the foundation pattern portion; and c) combining the impressions of the reconstruction set into a single reconstruction impression, the single reconstruction impression including the portion of the representation spanning a reconstruction metric greater than an impression metric of any single impression of the reconstruction set.

A non-transitory computer readable medium with computer executable instructions stored thereon executed by a processor to perform the method of reconstructing a portion of a representation of a fingerprint from a set of bitmap images, each bitmap image including a portion of a fingerprint from a finger, the method including a) selecting one of the bitmap images as a foundation image having a foundation fingerprint portion of a foundation finger; b) processing the set of bitmap images to determine a reconstruction set of bitmap images, the portion of the fingerprint of each bitmap image of the reconstruction set matched or correlated to the foundation fingerprint portion, wherein the reconstruction set of bitmap images excludes each bitmap image from the set of bitmap images with its portion of the fingerprint not matched or not correlated to the foundation fingerprint portion; and c) combining the bitmap images of the reconstruction set into a single reconstruction image, the single reconstruction image including the portion of representation of the fingerprint spanning a reconstruction area greater than an image area of any single bitmap image of the reconstruction set.

A machine-implemented pattern registration method for reconstructing a test pattern, including a) receiving a series of images in a serial order, each particular image of the series of images including a portion of a particular pattern; b) selecting an image of the series images as a foundation image; c) recording the foundation image into a reconstruction space as a pattern map wherein the pattern map includes a pattern map pattern having a foundation portion matching the particular pattern of the foundation image; d) recording the image into an image storage; e) producing a set of matching images by testing the portion of the particular pattern of each image of the series of images subsequent to the image for a match against the portion of the particular pattern of each image recorded into the image storage wherein the set of matching images includes a subset of the series of images with the match equal to TRUE and wherein each image having the match equal to FALSE is recorded into the image storage; f) producing a set of correlated images by testing the portion of the particular pattern of each image of the set of matching images for a correlation with the pattern map wherein the set of correlated images have the correlation equal to TRUE and wherein a non-correlated subset of the set of matching images having the correlation equal to FALSE are recorded into the image storage; and g) recording the set of correlated images into the reconstruction space to add them into the pattern map to produce a reconstructed pattern by aligning each portion of the particular pattern of each image of the set of correlated images with the pattern map pattern and using the reconstructed pattern as the pattern map; h) producing a reconstruction image from the reconstructed pattern, i) repeating a set of steps including steps e)-h) until a termination event occurs; and j) recording the reconstruction image into the memory as the test pattern.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 3 illustrates an initial reconstruction state presenting a first image portion;

FIG. 4 illustrates a second reconstruction state presenting a second image portion blended into the first image portion;

FIG. 5 illustrates a final reconstruction state presenting an Nth image portion blended into the previously blended image portion overlays.

DETAILED DESCRIPTION OF THE INVENTION

Figure 1:
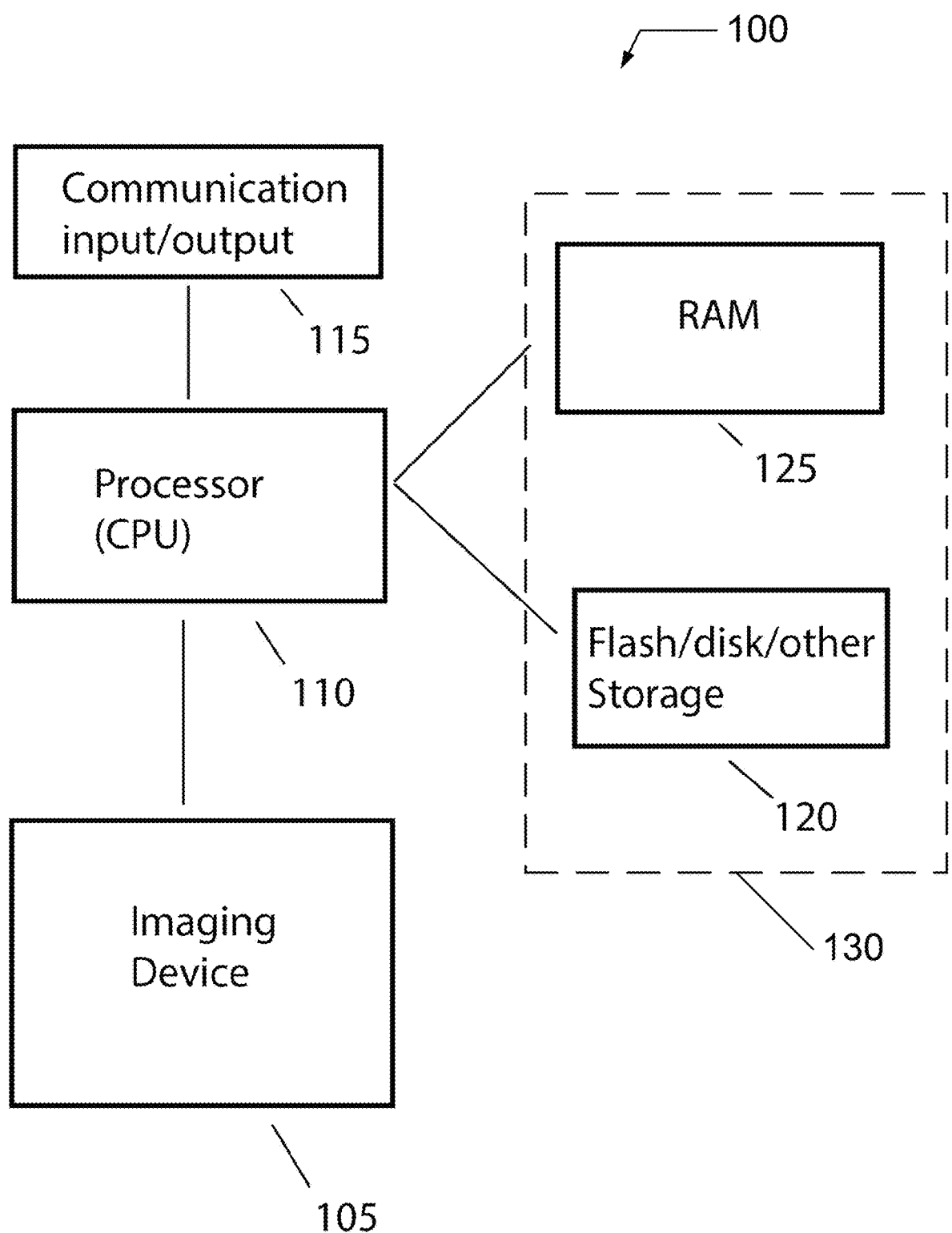
FIG. 1 illustrates a block schematic diagram of an embodiment for a pattern verification system.

Embodiments of the present invention provide a system and method for efficiently reconstructing a pattern, such as a fingerprint, from a set of multiple impressions of portions of that pattern. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

As used herein, the terms "match," "matching," and "matches" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression. A match does not require 100% commonality of features between the first and second patterns. One hundred percent, and nearly 100% (for example 95% commonality—depending upon application), commonality is referred to as a duplicate image. This results when the user places the same portion of the same finger on the sensor from two or more impressions. Sometimes a match is a determination from a matcher process or matcher engine, which can have a particular special meaning. Some embodiments of the present invention include just such a matcher process. However, the present invention is not constrained to determining matches in this fashion; the present invention includes use of an alignment engine for evaluating the condition of a match or a non-match between comparisons of a set of patterns.

As used herein, the terms "correlate," "correlating," and "correlated" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression without a match between the first pattern and the second pattern. Correlation is found by matching intermediate patterns that provide a bridge between the first pattern and the second pattern. For example, a second pattern may not match the first pattern, but may match a third pattern, with the third pattern matching the first pattern. Correlation may be found by one or more intermediate matches between the second pattern and the first pattern.

As used herein, the terms "near realtime" refers to a practicality of a time delay introduced, by automated data processing or data transmission, between an occurrence of an event of receiving a pattern impression from application of a pattern source to a pattern impressioner (e.g., an imager to create a bitmap image of a portion of a pattern associated the pattern source) and the subsequent processing of data for that pattern impression (e.g., a bitmap image), such as for display, feedback, or control purposes. Depending upon a processing speed, it may be possible to make multiple pattern impressions before a first pattern impression is processed. Some embodiments of the present invention process serial pattern impressions from a user in realtime or near realtime which may be considered equivalent when the processing delay is imperceptible to a user. For realtime, and near realtime embodiments, it is considered that pattern impressions are taken and processed serially, that is an impression and processing/feedback is provided before a next following pattern impression is processed.

In general, a pattern source (e.g., a finger) may include a pattern (e.g., a fingerprint). For a system that does not process the pattern (fingerprint) directly, the system may process a representation (e.g., a pattern map) of the pattern (fingerprint). When a user uses an impressioner (e.g., places a pattern source (finger) on a sensor or imager or other impression producing structure), the system may produce an impression (e.g., an image) of a portion of the pattern (fingerprint) of the pattern source (finger) of the user. Impressions (images) may be collected and evaluated, in bulk or in realtime or in near realtime depending upon a particular implementation. Reconstruction of the pattern or of the pattern map happens in a reconstruction space of the system (e.g., a portion of memory) where an initial impression (a foundation image) is selected and placed in an otherwise null reconstruction space. The system may qualify each impression (image) and may divide the impressions into a reconstruction set and a reserve set based upon matching or correlating to the reconstruction. As the qualification proceeds (matching and correlating to the reconstruction) a qualified set of impressions (images) are identified (the reconstruction set) and are added into the reconstruction space as they are matched/correlated or into the reserve space (e.g., a different portion of the memory as not matched/not correlated). A reconstruction (e.g., a reconstruction image or other representation of the pattern or pattern map) is produced from the impressions (images) from the reconstruction set and reconstructed in the reconstruction space. The reconstruction may occur as each impression is added into the reconstruction space or the reconstruction may occur after identification of multiple elements of the reconstruction set.

To help simplify the discussion, the following description has a general focus of reconstruction a portion of a representation of fingerprint using qualified bitmap images developed from a fingerprint sensor, along with determining a quality metric on some cases, and of providing feedback in some cases. This focus is not intended to limit the scope of the present invention to such systems and methods.

FIG. 1 illustrates a block schematic diagram of an embodiment for a pattern registration system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a fingerprint registration system that may be used as a pattern (e.g., fingerprint) verification system. In a fingerprint verification system, the system attempts to measure a correspondence between a pair of fingerprints (one-on-one) in order to establish, within some level of confidence, whether one pattern source (a finger) is the same or sufficiently close to another pattern source (a finger) that produces the other fingerprint. This is contrasted with an identification system that determines which pattern source (which finger belonging to which person) generated a particular fingerprint. A verification system may be used as an identification system when a decrease in power/speed is acceptable, given fixed resources. A verification system performs better as the quality of the registered images improves.

System 100 may function as a basic computer in implementing the present invention for accessing and processing fingerprints, fingerprint images, and sets of curves derived from a fingerprint as further described below. Processor 110 may include one or more central processing units (CPUs), selected from one or more of an x86, x64, ARM, or the like, architectures, connected to various other components, such as by a system bus.

Imaging device 105 produces an image of a fingerprint; either directly (e.g., it is a sensor or imager for a pattern source or an artifact from a pattern source) or it accesses a data structure or memory to obtain the image. The image may be of all or a portion of an entire fingerprint. Sometimes a portion of a fingerprint image may appear to be a set of discrete curves. System 100 is a computing system (e.g., an embedded computing system, a general purpose computing system, a special purpose computing system, combinations thereof, including a stored program computing platform with a processor and a coupled memory storing executable instructions) having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from device 105. In some cases, device 105 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

An operating system runs on processor 110, providing control and coordinating the functions of the various components of the system. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that are moved into and out of memory. These sets of instructions, when executed by processor 110, perform the methods and automated machine-implemented processes described herein. Device 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices are also connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring data, for example images, maps, instructions, or programs.

In use, system 100 processes a set of pattern images from a pattern source (e.g., a fingerprint) to reconstruct an image of the pattern source. Optionally, system 100 provides the user with feedback regarding a status and/or quality of the image reconstruction to aid in realtime impression gathering.

I/O system 115 may optionally include a display, other output or a visualization/audiblization system that supports a visualization graphic derived from a reconstruction image or provides some other indication or signal to the user. For example, as the user adds a new image to the set of images, each time the reconstruction image is enhanced by the addition of the new image, the visualization graphic is updated to illustrate the newly added information. For security, it may be desirable that the visualization graphic derived from the reconstruction image is degraded in some fashion (e.g., resolution) so that a true copy of the fingerprint is not on the display. Similarly, any image that is not immediately added to the reconstruction image may result in some other indication (e.g., tone) or temporary visual element on the display signaling that the image was not added.

During use, any particular image may serve as an intermediate bridging image that creates a correlation chain between images of the reconstruction image and stored images. When this happens, multiple images may be blended into the reconstruction image, and the visualization graphic may indicate that a plurality of images, including previously stored and unmatched/uncorrelated images, have been subsequently added to the reconstruction image.

It is not uncommon that a first image taken with an imager is degraded in some fashion (e.g., smudged or distorted). Subsequent pattern images may be unable to match this initial foundation image. System 100 provides that a new foundation image may be substituted for the initial image to avoid this condition. This substitution results when enough of the stored but unmatching/uncorrelated (to the foundation image) images are better correlated to an alternate stored image. In such a case, the foundation image is replaced by a different image and then the reconstruction image is rebuilt based on matches and correlations of the stored images to the new foundation image. One potential advantage of the illustrated embodiments may be that matching image portions blended into a reconstruction image may not be required to be retained. In such situations, an ability to shuffle images may be constrained by a lack of the underlying image portions. Solutions may include limiting shuffle to replacement of a single unmatched initial foundation image, retain the images for a longer period, and perhaps discard them after the final reconstruction image passes its quality metric, and/or discard the reconstruction image and continue to gather new images until the reconstruction image has sufficient quality without reference to previously blended image content.

Figure 2:
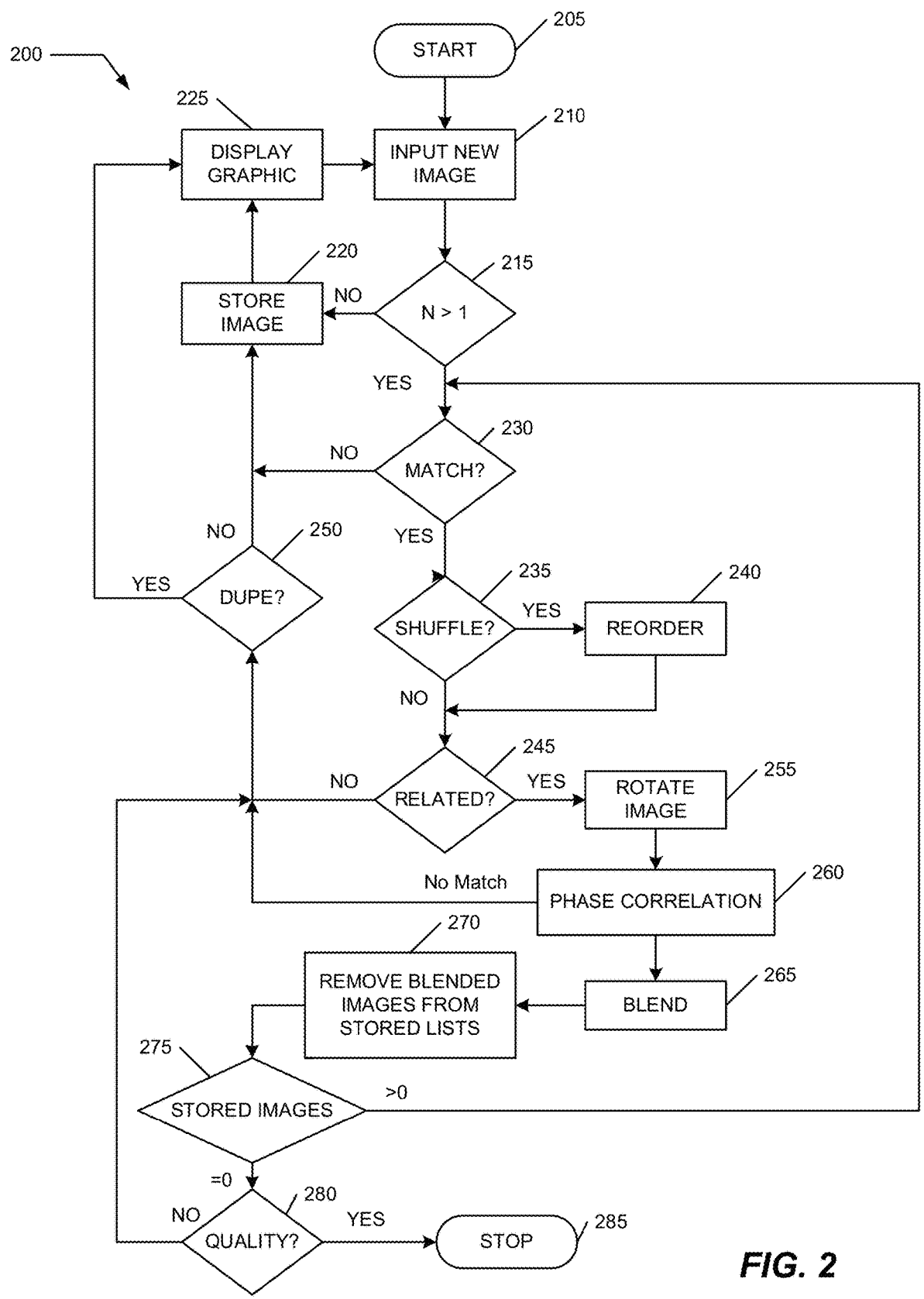
FIG. 2 illustrates a flow diagram of an embodiment for an image reconstruction process used in a pattern verification system.

FIG. 2 illustrates a flow diagram of an embodiment for an image reconstruction process 200, such as may be used in a pattern verification system. Process 200, executed by system 100 for example, includes a series of steps 205-285. Process 200 begins at start step 205 which includes a realtime implementation with step 205 accessing an imager wherein a set of images are received in sequence, such as from serial impressions of a finger on a fingerprint sensor. Alternatively, there may be a previously constructed storage of the set of images, and start 205 accesses the storage. Start 205 initializes process 200, clears a reconstruction space where the representation of the fingerprint will be reconstructed, and initializes a counter.

A step 210 follows start step 205 to serially access each image. The counter is incremented with each input image. For the first image, the counter has N=1. A test at step 215 tests whether system 100 is processing an initial foundation image (e.g., N=1) or a subsequent image (N>1). When processing the initial image (e.g., N not greater than 1) the test is FALSE, process 200 branches to step 220 from the test at step 215. Step 220 stores the image into a memory of system 100 and then proceeds to optional step 225 to update the display graphic to the user of the status of the reconstruction image in the reconstruction space. The display graphic is updated at this point to simply present the initial foundation image as the current reconstruction image (or a degraded image derived from the initial foundation image is presented). After step 225, process 200 returns to step 210 to input a new image (which increments the counter). Thereafter process 200 again performs the test at step 215 but the test is now TRUE and process 200 then performs another test at step 230.

The test at step 230 establishes whether the new image matches any other stored image or matches the reconstruction image. For N=2, the initial image is the foundation image used as an initial reconstruction image and the second image is compared against the first image for a match. For N=3, the third image is compared against the reconstruction image and all images that are stored (in some cases, the initial foundation image is stored in two locations—in the reconstruction space as the reconstruction image and also in memory as another image portion like the others) for a match. When the test at step 230 is FALSE and the new image does not match any other image, process 200 branches to step 220 and stores the new image. Thereafter the display graphic is updated with an indication associated with a receipt of a non-matching image. There are four possible results from the test at step 230: no match, or one of three different types of match. These three include a match to the initial foundation image, a match to one or more images correlated to the foundation image (some of which may be part of the current pattern map), or a match to one or more stored images that are not correlated to the foundation image (none of which are part of the current pattern map).

When the test at step 230 is TRUE and the new image matches at least one other image, process 200 performs a test at step 235 to determine whether the foundation image needs to be changed. The process of changing the foundation image is referred to as shuffling in which the stored image having the greatest number of correlated images is substituted for the current foundation images and the stored images correlated to the new foundation image are reordered and placed into the reconstruction space to become part of a new pattern map. This step does not imply a requirement for some type of randomness to the substitution, but refers to a rearrangement and reordering. The test at step 235 determines whether there exists an image portion in memory that would offer a better foundation image, responsive to a metric (e.g., number of correlated images or pattern map quality metric) as compared to the current foundation image and its corresponding metric. When the test at step 235 is TRUE (and there is a better alternative foundation image), process 200 branches to step 240 and substitutes a new foundation image.

After reording step 240 is complete, or when the test at step 235 is FALSE, process 200 advances to step 245 to test whether the new image portion is correlated to the current foundation image. When the test at step 245 is FALSE, process 200 branches to a step 250 to test whether the new image is a duplicate image. When the test at step 250 is FALSE and is not a duplicate, process 200 stores the image at step 220 (and then provides an indication on the display graphic at step 225 that the new image was not a non-duplicate correlated image). When the test at step 250 is TRUE (and the new image is a non-correlated duplicate image) then process 200 advances directly to the display graphic step 225 and provides any suitable indication that the most recent image was a non-correlated duplicate image.

When the test at step 245 is TRUE (and the new image is correlated to the current foundation image) process 200 advances to step 255 to begin processing the new image. Process image at step 255 rotates and/or translates the new image into its appropriate location vis-à-vis the reconstruction image. Note that information related to rotation and/or translation and/or other pre-blending processing may be obtained from the match-checking process in some embodiments of the present invention.

After rotations/translations of the new image, process 200 performs a phase correlation step 260 to fine-tune the rotation/translation which also may serve as a secondary match test. When step 260 is not able to confirm or accurately place the image into the reconstruction image, step 260 stops the reconstruction and branches to step 250 to test for duplicate. When step 260 is able to accurately place the new image with respect to the reconstruction image, the following step 265 blends the image into the reconstruction image to create a single image. At this step 260, the confirmed-matching new image portion is added into the reconstruction image. When the new image is not a duplicate, new image information is present and the reconstruction image is appropriately enlarged by the amount of the new non-overlapping pattern information. The enlarged reconstruction image covers an increased area. After blending step 265, process 200 performs preferred but optional step 270 to remove those individual discrete images that have been blended into the reconstruction image from storage (as individual images). Typically one image is blended at a time, and step 270 typically removes a single image at a time. However in the case of the second image that matches the foundation image, the second is blended into the first and then two images may be removed from image storage.

Addition of the new image(s) into the reconstruction image at the location and orientation it matches the current reconstruction image changes the reconstruction image. These changes typically include an increase in the size of the reconstruction image but may also include an improvement in a portion of the existing reconstruction image.

After step 270, a test at step 275 is made to determine whether there are any stored image portions remaining in image portion memory. When there are stored images (number of stored images greater than zero is TRUE), process 200 returns to step 230 to check whether any of the remaining stored images now matches the new reconstruction image. When the test at step 275 is FALSE, process 200 performs a quality check of the reconstruction image.

In this embodiment, increased area size after blending is used in step 280 to test a quality of the reconstruction image. A quality metric is established, for example, by the covered area as a percentage of the total possible area. When this quality metric indicates that the reconstruction image does not have sufficient quality, process 200 branches to step 250 to test whether the newly added image was a duplicate. The nature of certain patterns, such as fingerprints, and the definition of what a duplicate image is for any particular embodiment, may lead to a result that a duplicate image may still provide some new pattern information that was not part of the current reconstruction image.

When the test at step 280 is TRUE, process 200 branches to step 285 and stops, with any post-process update, reporting, storage, or image manipulation performed. For example, the display graphic may be presented to the user with a final pattern map, a success message, an identification of distinct individual overlapping images used in the final reconstruction image (as further explained below with respect to FIG. 6), or combination thereof.

Process 200 defines the generalized flow of reconstructing a portion of a representation of a fingerprint from a set of image that are assumed to be from the fingerprint. Implementation of process 200 may include additional tests and flag indicators to reflect one or more states of the image store and/or the reconstruction image. For example, FIG. 2 may imply that certain branching occurs until a number of stored images is reduced to zero. In practice, the loop to 230 occurs until all the stored images have been tested and processed if needed, and it may be the case that a number of stored images is greater than zero without branching, the stored images being tested against the reconstruction image without any further additions or changes. Additionally, FIG. 2 does not explicitly address a special case when step 230 matching fails before reaching an end of the stored list. In this case, a failed match simply moves to the next stored image bypassing the rotate blend stages. Other implementation details may be included in an embodiment of the present invention to account for other boundary conditions and states, FIG. 2 not intended to be an explicit detailed illustration of an actual working program for all possible uses.

Figure 3:
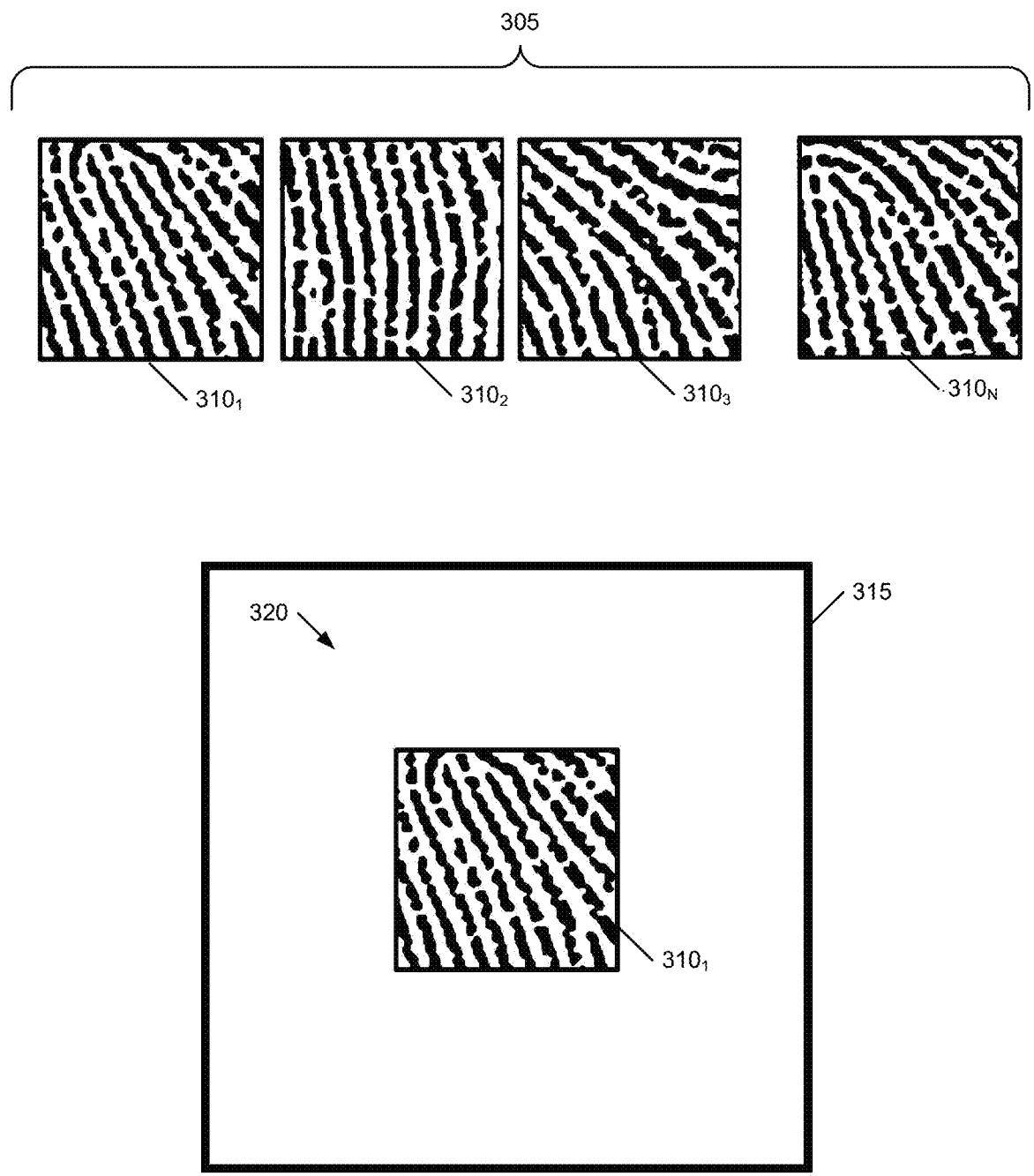
FIG. 3-FIG. 5 illustrate a sequence of reconstruction image representations from a set of N pattern portions.
Figure 4:
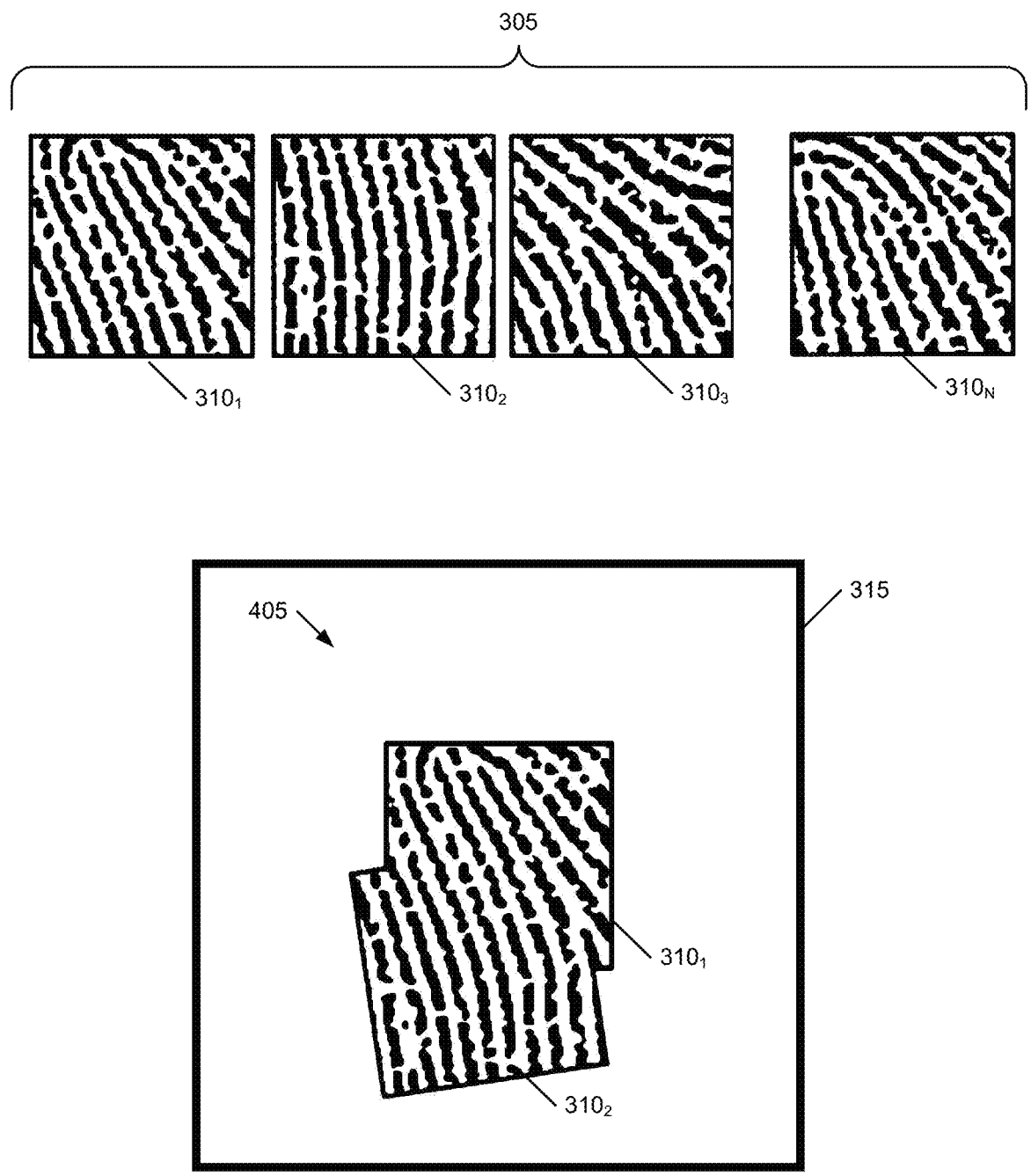
Figure 5:
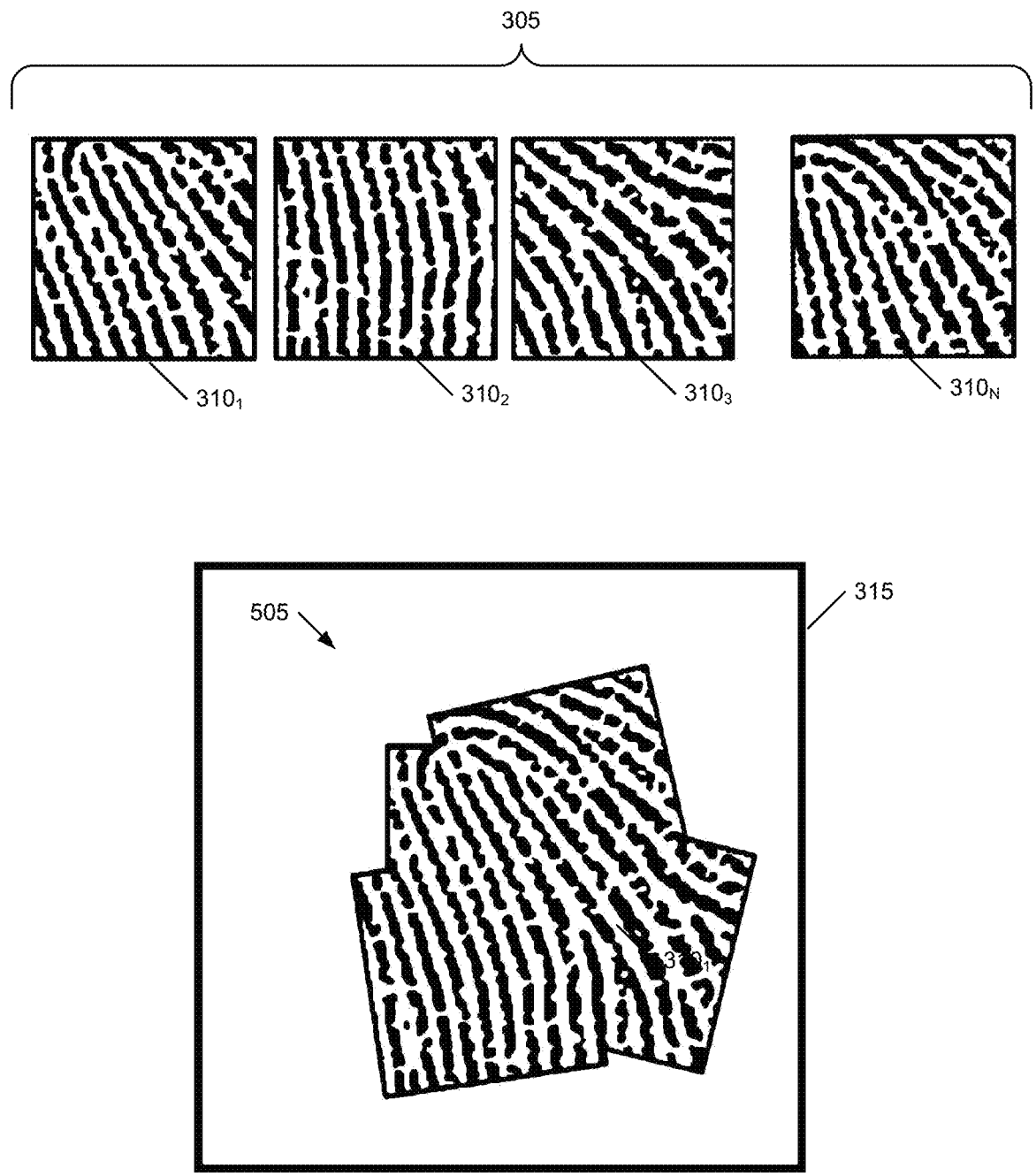

FIG. 3-FIG. 5 illustrate a sequence of reconstruction image representations from a set of N images. FIG. 3 illustrates an initial state of the reconstruction presenting a first image, FIG. 4 illustrates an intermediate state of the reconstruction image presenting a second image blended into the first image, and FIG. 5 illustrates a final state of the image reconstruction presenting an Nth image blended into the previously blended images defining the current reconstruction image.

FIG. 3 includes a set 305 of images $310_x$, x=1 to N. The images represent the result of an impression taken from an imager, such as a portion of a fingerprint sampled from a small fingerprint scanner. Also included in FIG. 3 is a representation of a reconstruction space 315, such as a section of memory of system 100, which contains a reconstruction image 320 as it is created. Initially reconstruction space 315 contains image portion $310_1$ as reconstruction image 320 because image $310_1$ represents the initial foundation image. Not illustrated in this sequence, but as noted herein, during processing the initial foundation image may be changed until an image is blended.

FIG. 4 illustrates translation and rotation of second image $310_2$ after process 200 has processed it and determined that it is a non-duplicate matching image. Reconstruction space 315 includes an expanded intermediate reconstruction image 405. Images continue to be added into reconstruction space 315 and blended into reconstruction image 405 until the quality metric or other test determines that the collection of images contributing to the current reconstruction image meets the quality metric.

FIG. 5 illustrates translation and rotation of the remaining matching image $310_x$ into a final (assuming quality metric is met, for example) reconstruction image 505. A quality metric may be represented as a coverage percentage of pattern map 505 of the area bounded by a representation of the reconstruction space 315. In some implementations of system 100 and process 200, it may be assumed that when pattern map 505 includes at least a particular number of blended images that the desired quality is achieved. That is, when pattern map 505 includes a minimum number of blended images, it may be that the quality metric is satisfied. Other metrics may be used.

Figure 6:
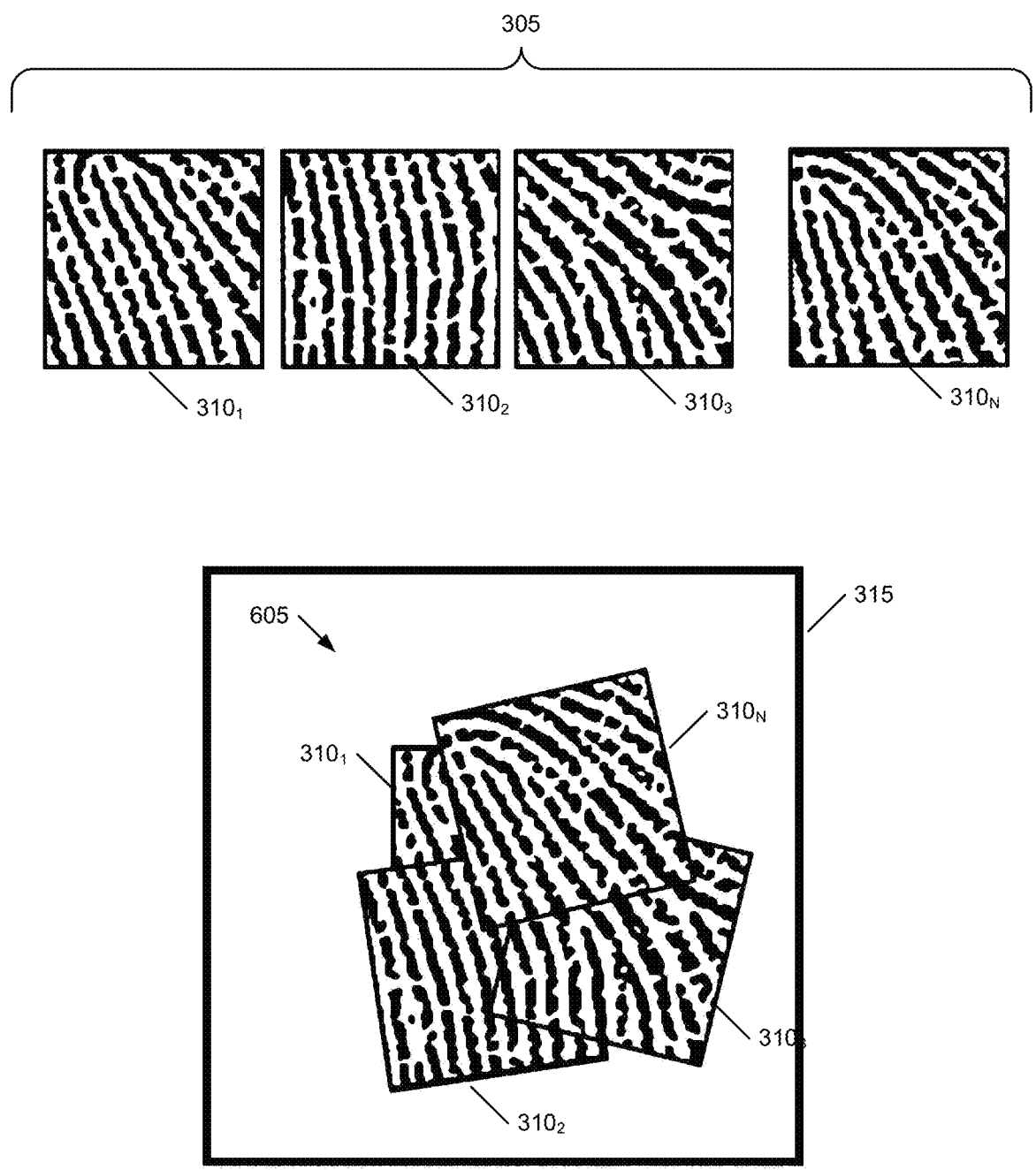
FIG. 6 illustrates a final pattern map resulting from discrete overlays of the image portions generally equivalent to the final reconstruction state illustrated in FIG. 5.

FIG. 6 illustrates a final representation of a fingerprint 605 in reconstruction space 315 resulting from an overlap of images defining the final reconstruction image 505 illustrated in FIG. 5. In FIG. 3-FIG. 5, the reconstruction image is represented as a blend of a set of discrete matching images. The images themselves may be discarded as separate entities. For some processes, it may be advantageous to maintain the images making up the reconstruction image in discrete form, and in other cases, a blending of the images may be desired to produce a single image. For example, in an embodiment using a fingerprint registration system, the reconstruction image in the reconstruction space will be used as a trusted image. For many systems, it may be not be desirable to store the reconstruction image as a bitmap in a trusted memory. Encryption may be desired, and there may be advantages to alternative representations (e.g., templates) derived from the reconstruction image or from a set of templates of individual images of an entire pattern. When the images are not blended, such as illustrated in FIG. 6, there may be multiple mini-templates derived from the individual images that are part of the reconstruction image. However, when the images are blended as illustrated in FIG. 5, a single template may be formed. Implementation details may determine whether one approach of the other is appropriate and/or beneficial.

Moreover, those skilled in the art will appreciate that the above described methods may be practiced using any one or a combination of computer processing system configurations, including, but not limited to, single and multi-processer systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program mechanisms recorded thereon for directing the computer processor to facilitate the implementation and practice of the above described methods. Such devices and articles of manufacture also fall within the spirit and scope of the present invention.

The invention can be implemented in numerous ways, including for example as a method (including a computer-implemented method), a system (including a computer processing system, general purpose, special purpose, hybrid, embedded, and the like), an apparatus, a computer readable medium, a computer program product, a graphical user interface, a web portal, or a data structure tangibly fixed in a computer readable memory. Several embodiments of the present invention are discussed herein. The appended drawings illustrate only typical embodiments of the present invention and therefore are not to be considered limiting of its scope and breadth. The system, methods, and computer-program products have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

System 100 includes a computer program product or software that is stored on or in a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, the software can include a plurality of modules for performing system tasks such as performing the methods previously described herein. A processor interprets instructions to execute the software, as well as, generates automatic instructions to execute software for system responsive to predetermined conditions. Instructions from both the user interface and the software are processed by the processor for operation of system 100. In some embodiments, a plurality of processors can be utilized such that system operations can be executed more rapidly.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A machine-implemented method for reconstructing a portion of a representation of a pattern from a set of impressions, each impression including a portion of the pattern, the method comprising:
   a) selecting one of the impressions as a foundation impression having a foundation pattern portion of a foundation pattern source;
   b) processing the set of impressions to determine a reconstruction set of impressions, the processing further comprising a rotation and/or translation step and a phase correlation step, the portion of the pattern of each said impression of said reconstruction set matched or correlated to said foundation pattern portion, wherein said reconstruction set of impressions excludes each impression from the set of impressions with its portion of the pattern not matched or not correlated to said foundation pattern portion; and
   c) combining said impressions of said reconstruction set into a single reconstruction impression by blending the reconstruction set of impressions, said single reconstruction impression including the portion of the representation spanning a reconstruction metric greater than an impression metric of any single impression of said reconstruction set; and
   wherein said processing step b) further comprises substituting a different impression from the set of impressions for said foundation impression when a shuffle condition is set and thereafter reprocessing step b) using the set of impressions against said different impression.

2. The method of claim 1 further comprising:
   d) presenting said reconstruction impression on a display.

3. The method of claim 2 wherein the pattern includes a fingerprint, wherein the set of impressions include a set of bitmap images, wherein said foundation impression includes a foundation bitmap image, wherein said reconstruction set of impressions includes a reconstruction set of bitmap images, wherein said reconstruction impression includes a reconstruction image, wherein said reconstruction metric includes a reconstruction area, wherein said impression metric includes an impression area, and wherein said step b) further includes:
   b1) selecting serially each bitmap image of the set of bitmap images as a next bitmap image;
   b2) evaluating each next bitmap image whether its portion of the pattern it is matched or correlated to said foundation pattern portion;
   b3) adding said next bitmap image to said reconstruction set when matched or correlated;
   b4) adding said next bitmap image to a reserve set of bitmap images when not matched or not correlated; and
   b5) repeating, using a different one bitmap image from one of the set of bitmap images or from said reserve set of bitmap images as said next bitmap image, a set of steps including steps b2)-b4) until a termination event occurs.

4. The method of claim 3 wherein step b) further comprises:
   b6) determining a quality metric for said reconstruction image;
   b7) comparing said quality metric against a predetermined quality metric target; and
   b8) setting said termination event when said quality metric has a predetermined relationship to said predetermined quality metric target.

5. The method of claim 4 wherein said quality metric includes a reconstructed area of the portion of the fingerprint and wherein said quality metric target includes a target area for said reconstructed area.

6. The method of claim 3 wherein said reconstruction image represents a validated reconstruction image, further comprising:
   d) recording, responsive to said termination event, said validated reconstruction image into a trusted registration memory.

7. The method of claim 6 further comprising:
   e) recording, responsive to said termination event, said reconstruction set into said trusted registration memory.

8. The method of claim 1 further comprising:
   d) presenting a degraded representation of said reconstruction impression on a display.

9. The method of claim 1 wherein the set of impressions is produced from a series of impressions from a pattern source, and wherein each said impression is processed serially in near realtime by step b).

10. The method of claim 9 further comprising:
d) providing a positive confirmation to an external indicator as each impression is added to said reconstruction set; and
e) providing a negative confirmation to an external indicator as each impression is excluded from said reconstruction set.

11. The method of claim 1 wherein said processing step b) further comprises adding multiple impressions into said reconstruction set in response to detection of a correlation chain.

12. A machine-implemented method for reconstructing a portion of a representation of a pattern from a set of impressions, each impression including a portion of the pattern, the method comprising:
a) selecting one of the impressions as a foundation impression having a foundation pattern portion of a foundation pattern source;
b) processing the set of impressions to determine a reconstruction set of impressions, the processing further comprising a rotation and/or translation step and a phase correlation step, the portion of the pattern of each said impression of said reconstruction set matched or correlated to said foundation pattern portion, wherein said reconstruction set of impressions excludes each impression from the set of impressions with its portion of the pattern not matched or not correlated to said foundation pattern portion; and
c) combining said impressions of said reconstruction set into a single reconstruction impression by blending the reconstruction set of impressions, said single reconstruction impression including the portion of the representation spanning a reconstruction metric greater than an impression metric of any single impression of said reconstruction set;
wherein the pattern includes a fingerprint, wherein the set of impressions include a set of bitmap images, wherein said foundation impression includes a foundation bitmap image, wherein said reconstruction set of impressions includes a reconstruction set of bitmap images, wherein said reconstruction impression includes a reconstruction image, wherein said reconstruction metric includes a reconstruction area, wherein said impression metric includes an impression area, and wherein said step b) further includes:
b1) selecting serially each bitmap image of the set of bitmap images as a next bitmap image;
b2) evaluating each next bitmap image whether its portion of the pattern it is matched or correlated to said foundation pattern portion;
b3) adding said next bitmap image to said reconstruction set when matched or correlated;
b4) adding said next bitmap image to a reserve set of bitmap images when not matched or not correlated; and
b5) repeating, using a different one bitmap image from one of the set of bitmap images or from said reserve set of bitmap images as said next bitmap image, a set of steps including steps b2)-b4) until a termination event occurs;
wherein said processing step b) further comprises substituting a different bitmap image from the set of bitmap images for said foundation image when a shuffle condition is set; resetting the reserve set, and thereafter reprocessing step b) using the set of bitmap images against said different bitmap image.

13. The method of claim 12 wherein said shuffle condition includes a ratio of a number of impressions in said reserve set as compared to a number of impressions in said reconstruction set.

14. The method of claim 12 wherein said shuffle condition includes a quality metric for said reconstruction image responsive to a number of bitmap images in said reconstruction set, wherein said shuffle condition is set when a ratio of said quality metric as compared to a predetermined target quality metric has a predetermined relationship.

15. An apparatus for reconstructing a portion of a representation of a pattern from a set of impressions, each impression including a portion of the pattern, comprising:
an image sensor producing one or more of the impressions; and
a processing system, coupled to said image sensor, including a processor and a memory coupled to said processor, said memory storing a plurality of computer executable instructions wherein said processor executes said plurality of computer executable instructions to perform a method, comprising:
a) selecting one of the impressions as a foundation impression having a foundation pattern portion of a foundation pattern source;
b) processing the set of impressions to determine a reconstruction set of impressions, the processing further comprising a rotation and/or translation step and a phase correlation step, the portion of the pattern of each said impression of said reconstruction set matched or correlated to said foundation pattern portion, wherein said reconstruction set of impressions excludes each impression from the set of impressions with its portion of the pattern not matched or not correlated to said foundation pattern portion; and
c) combining said impressions of said reconstruction set into a single reconstruction impression by blending the reconstruction set of impressions, said single reconstruction impression including the portion of the representation spanning a reconstruction metric greater than an impression metric of any single impression of said reconstruction set; and
wherein said processing step b) further comprises substituting a different impression from the set of impressions for said foundation impression when a shuffle condition is set and thereafter reprocessing step b) using the set of impressions against said different impression.

16. A non-transitory computer readable medium with computer executable instructions stored thereon executed by a processor to perform the method of reconstructing a portion of a representation of a pattern from a set of impressions, each impression including a portion of the pattern, the method comprising:
a) selecting one of the impressions as a foundation impression having a foundation pattern portion of a foundation pattern source;
b) processing the set of impressions to determine a reconstruction set of impressions, the processing further comprising a rotation and/or translation step and a phase correlation step, the portion of the pattern of each said impression of said reconstruction set matched or correlated to said foundation pattern portion, wherein said reconstruction set of impressions excludes each impression from the set of impressions with its portion of the pattern not matched or not correlated to said foundation pattern portion; and c) combining said impressions of said reconstruction set into a single reconstruction impression by blending the reconstruction set of impressions, said single reconstruction impression including the portion of the representation spanning a reconstruction metric greater than an impression metric of any single impression of said reconstruction set; and wherein said processing step b) further comprises substituting a different impression from the set of impressions for said foundation impression when a shuffle condition is set and thereafter reprocessing step b) using the set of impressions against said different impression.

\* \* \* \* \*